(No Model.)
J. BURGE.
AUTOMATIC DAMPER REGULATOR.
No. 327,132. Patented Sept. 29, 1885.
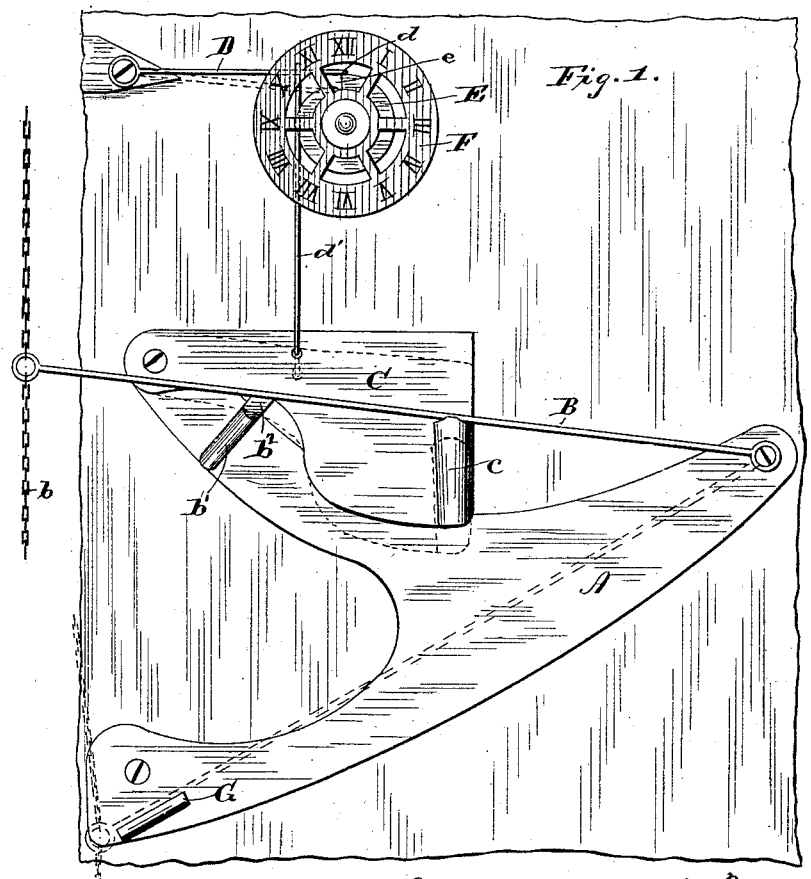
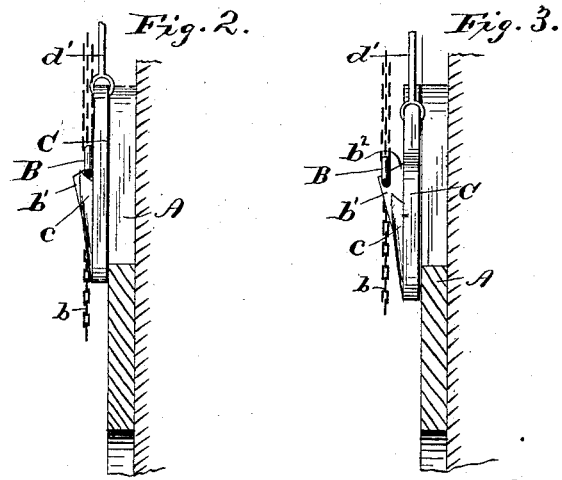
Witnesses.
Charles R. Burr
A. J. Stewart
Inventor.
John Burge
by Franck D. Johns
his Attorney.

UNITED STATES PATENT OFFICE.

JOHN BURGE, OF WESTFIELD, MASSACHUSETTS.

AUTOMATIC DAMPER-REGULATOR.

SPECIFICATION forming part of Letters Patent No. 327,132, dated September 29, 1885.

Application filed May 26, 1885. (No model.)

*To all whom it may concern:*

Be it known that I, JOHN BURGE, a citizen of the United States, residing at Westfield, in the county of Hampden and State of Massachusetts, have invented certain new and useful Improvements in Automatic Fire-Damper Regulators; and I do hereby declare the following to be a full, clear, and exact description of the invention, such as will enable others skilled in the art to which it appertains to make and use the same.

My invention relates to certain improvements in automatic damper-regulators, which can be set to open or close a damper or other similar device at any desired time.

It consists of certain novel construction and arrangement of the various parts, all of which I will now proceed to point out and describe, reference being had to the accompanying drawings, in which—

Figure 1 is a side elevation. Fig. 2 is a vertical section taken on line $x\ x$, Fig. 1, showing the lever held on the incline plane by the latch; Fig. 3, a vertical section showing lever released from the latch.

Referring to said drawings, A is a plate secured to a vertical wall or frame; B, a lever pivoted to one end of the plate A. Said lever B is connected by a chain or other suitable means with the damper, which is set to open or close by the falling of suitable weights, or is operated by springs. The lever B is connected by a rope or chain, $b$, and pulleys with these weights or springs, and when said lever is released from the retaining devices said weights or springs are free to operate, and thus open or close the damper.

$b'$ is a projection on the plate A, provided with a downwardly-inclined surface, $b^2$.

C is a latch pivoted to the plate A.

$c$ is a hook on the lower end of the latch C. When adjusted, the hook $c$ engages with the lever B, and holds the same on the upper part of the inclined surface of the projection $b'$, and sets the weights or springs in position to operate the damper when the lever B is released. When the latch falls, the projection $b'$ releases the lever from the hook $c$, and said lever slides off the inclined surface $b^2$ and allows the weights or springs to operate the damper.

D is a lever-arm pivoted to the wall or frame at a point above the plate A, and having its free end $d$ bent, as shown. $d'$ is a rod or chain connecting the lever-arm with the latch C.

E is a rotating disk having the notch $e$ in its periphery. The end of the lever rests on the periphery of the disk E. Said disk is so arranged that the notch $e$ comes under the end $d$ of the lever-arm at any desired time. To accomplish this, the disk is connected with the mechanism of a clock, F, by any of the well-known devices used for such purposes. If desired, it may be made a part of and be attached to the back of a clock, as shown.

The connecting rod or chain $d'$ is made sufficiently long to permit the latch to fall far enough to bring the hook $c$ below the plane of the inclined surface $b^2$, and thus release the lever from said hook when the said latch falls.

The operation of my invention is as follows: The lever B is placed in the hook $c$ of the latch C, and rests upon the upper part of the inclined surface $b^2$ of the projection $b$. This raises the weights or sets the springs in position to operate the damper when released by the falling of the lever. The hook $c$ holds said lever on the incline. The end of the lever-arm D rests upon the periphery of the disk E, and holds the latch up by means of the connecting rod or chain $d'$. The disk is then set to rotate, so that the notch $e$ will come under the end of the lever-arm at any desired time. When the notch $e$ comes under the end of the lever-arm it falls into the same, and the hook $c$ falls below the plane of the incline $b^2$. The lever B, being released from the hook $c$, slides off the incline $b^2$ and falls to the position shown in dotted lines. The weights or springs connected with the damper are thus released and operate said damper.

G is a stop limiting the downward movement of the lever B.

Having thus fully described my invention, I claim as new and desire to secure by Letters Patent—

1. In a damper-regulator, the plate A, having the projection $b'$, provided with the downwardly-inclined upper face, $b^2$, in combination with the lever B, pivoted to the plate A, and the latch C, having the lever-supporting hook $c$, all arranged and operating to the end that the lever will be released from the supporting-hook as it strikes the projection when the latch falls, substantially as shown and described.

2. In a damper-regulator, the plate A, having the projection $b'$, provided with the downwardly-inclined upper face, $b^2$, and the lever B, pivoted to said plate A, in combination with the disk E, adapted to be rotated and having the notch $e$ in its periphery, the lever-arm D, latch C, having the supporting-hook $c$, for holding the lever B, and the connecting-rod $d'$, of sufficient length to permit the supporting-hook to fall below the plane of the incline face $b^2$, whereby the lever will be released from the supporting-hook as the latch falls and the lever strikes the projection, substantially as shown and described.

In testimony whereof I affix my signature in presence of two witnesses.

JOHN BURGE.

Witnesses:
HUBERT LYMAN,
ELLEN M. BEEBE.